J. MOORE.
CALF FEEDER.
APPLICATION FILED OCT. 14, 1910.
1,062,657.
Patented May 27, 1913.
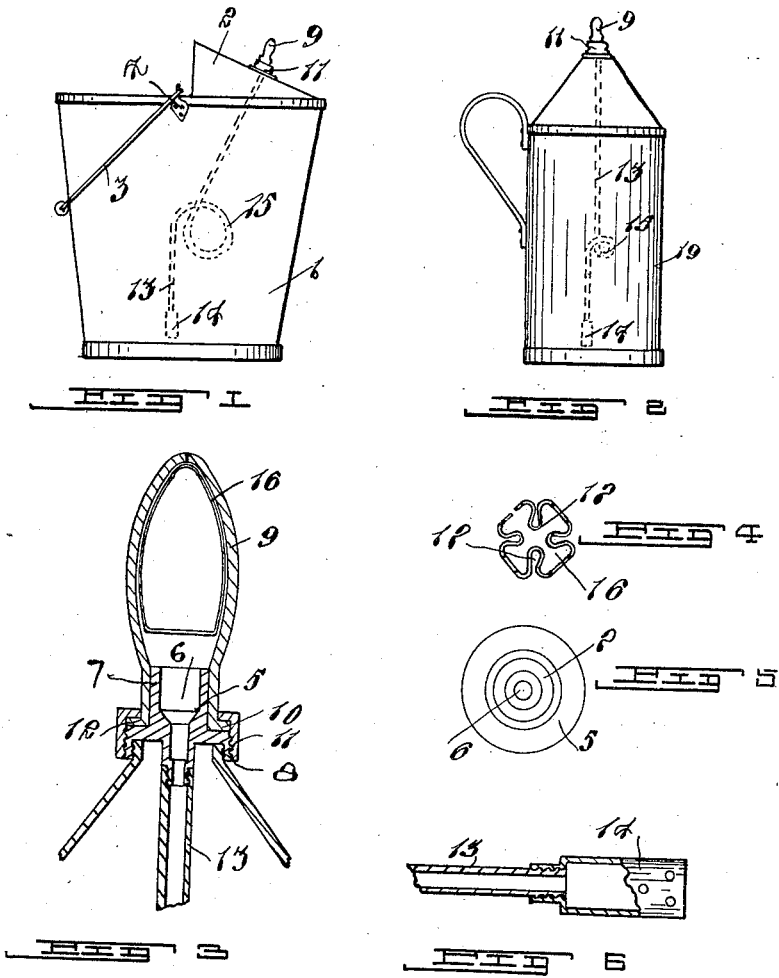
WITNESSES.
D. Wakefield.
R. Foster.
INVENTOR.
J. MOORE.

UNITED STATES PATENT OFFICE.

JOHN MOORE, OF WINNIPEG, MANITOBA, CANADA.

CALF-FEEDER.

1,062,657.

Specification of Letters Patent.

Patented May 27, 1913.

Application filed October 14, 1910. Serial No. 587,112.

*To all whom it may concern:*

Be it known that I, JOHN MOORE, of the city of Winnipeg, in the Province of Manitoba, Canada, have invented certain new and useful Improvements in Calf-Feeders, of which the following is the specification.

My invention relates to a feeder for calves, colts or other such young animals, and the object of the invention is to provide an inexpensive and durable feeder by which milk or other such liquid can be fed to the animal in proper quantities and produce healthy condition, the present invention being in reality an improvement on a calf feeder described by me in my previous applications filed in Canada 26th day of April, 1910, Serial No. 153,861, and United States filed 2nd day of June, 1910, Serial No. 564,664.

The invention consists essentially in the novel arrangement and construction of parts hereinafter explained and fully pointed out in the appended claim.

Referring to the drawings, Figure 1 represents a side elevation of a pail with my invention applied. Fig. 2 represents a side elevation of a can with my invention applied. Fig. 3 represents an enlarged detailed vertical sectional view through the nipple and adjoining parts. Fig. 4 represents a plan view of the spring member inserted within the nipple. Fig. 5 is a plan view of the coupling piece connecting the nipple and the tube. Fig. 6 is a longitudinal sectional view through the strainer and the portion of the tube connected to the strainer.

In the drawings like characters of reference indicate corresponding parts in each figure.

1 represents a pail provided with the usual protecting piece or guard 2 at the top and supplied with the ordinary handle 3 carried by the ears 4.

5 is a coupling piece having a central opening or duct 6 therein and provided with an upwardly extending neck 7 and a doubly or interiorly and exteriorly threaded flange 8, which flange is adapted to thread on to the guard 2, which guard is supplied with a suitably threaded ring to receive it.

9 is a flexible nipple made from rubber or such like material and having an outwardly directed flange 10 formed on its lower end. The nipple is fitted on to the neck of the coupling piece and is held to it by a removable flanged member 11 which is screwed to the coupling and jams the flange 10 against the shoulder formed at 12 on the coupling. A metallic tube 13 has its upper end threaded to the coupling piece and has the lower end threaded into a sieve 14 which is located at the bottom of the pail.

I have found that block tin tubing forms a very suitable flexible tube, being a great deal better than the rubber tube which I supplied in the invention referred to in the first part of this specification. A metal tube is very easily cleaned and is consequently more sanitary and will not become affected through the action of the milk as does the rubber.

In order to prevent the nipple from collapsing when the animal is feeding, I have placed in it a spring member 16 which is formed in the present instance from a single strand of wire bent backwardly and forwardly to form four distinct loops 17, which loops are bent so as to comply more or less with the inner contour of the nipple. When the animal feeds the loops collapse sufficiently to allow the animal to suck the milk from the pail.

In the drawings I have shown several different applications of the invention so that one can easily understand how it can be used to advantage for feeding different animals as well as feeding one or many at a time. The pail adaptation appearing in Fig. 1 is particularly useful when one desires to feed calves.

The can 19 shown in Fig. 2 is supplied for colts or lambs and it is simply stood on the ground in the field in a box so that the animal can approach it at will. I have found that colts and lambs are more easily frightened than calves and are more suspicious and nervous, and for this reason I suggest the use of a can instead of the pail.

I have shown these various uses of the feeder so as to suggest how it can be used to advantage under different conditions and while only two are shown I wish it to be distinctly understood that any other adaptations which might be suggested are simply modifications of my invention and as such come under the appended claim.

What I claim as my invention is:

The combination with a suitable supporting member provided with a threaded ring, of a coupling provided on its lower side with a downwardly extending interiorly and exteriorly threaded flange, the interior thread receiving the ring and provided on its upper side with an extending neck, the neck being of smaller cross sectional area than the body of the coupling thereby forming an external shoulder, there being further a central continuous passageway through the coupling and neck, a nipple receiving the neck provided with an out-turned flange bearing on the shoulder, an interiorly threaded flange member threaded on the exteriorly threaded face of the coupling piece the flange of the member jamming the flange of the nipple against the shoulder, a metallic tube threaded to the coupling piece and communicating with the passage-way and a metallic strainer removably secured to the free end of the tube, as and for the purpose specified.

Signed at Winnipeg, in the Province of Manitoba, this 26th day of September, 1910.

JOHN MOORE.

In the presence of—
B. S. ROXBURGH,
J. K. ELKIN.

Copies of this patent may be obtained for five cents each, by addressing the "Commissioner of Patents, Washington, D. C."